(12) United States Patent
Papadelis et al.

(10) Patent No.: US 11,016,176 B2
(45) Date of Patent: May 25, 2021

(54) METHOD, DEVICE AND SYSTEM FOR MAPPING POSITION DETECTIONS TO A GRAPHICAL REPRESENTATION

(71) Applicant: AXIS AB, Lund (SE)

(72) Inventors: Aras Papadelis, Lund (SE); Peter Henricsson, Lund (SE); Mikael Göransson, Lund (SE)

(73) Assignee: Axis AB, Lund (SE)

( * ) Notice: Subject to any disclaimer, the term of this patent is extended or adjusted under 35 U.S.C. 154(b) by 531 days.

(21) Appl. No.: 15/945,457

(22) Filed: Apr. 4, 2018

(65) Prior Publication Data
US 2018/0292526 A1 Oct. 11, 2018

(30) Foreign Application Priority Data
Apr. 5, 2017 (EP) ..................................... 17165028

(51) Int. Cl.
*G01S 7/48* (2006.01)
*G01S 13/86* (2006.01)
(Continued)

(52) U.S. Cl.
CPC .............. *G01S 7/4808* (2013.01); *G01S 7/06* (2013.01); *G01S 7/295* (2013.01); *G01S 7/4026* (2013.01); *G01S 7/4972* (2013.01); *G01S 7/51* (2013.01); *G01S 13/42* (2013.01); *G01S 13/865* (2013.01); *G01S 13/867* (2013.01); *G01S 13/886* (2013.01);
(Continued)

(58) Field of Classification Search
None
See application file for complete search history.

(56) References Cited

U.S. PATENT DOCUMENTS 8,446,492 B2 5/2013 Nakano et al.
8,625,854 B2 * 1/2014 Valkenburg ............. G01S 17/87
382/106
(Continued)

FOREIGN PATENT DOCUMENTS

CA 2 898 390 A1 10/2006
JP 2004212129 A2 7/2004
(Continued)

OTHER PUBLICATIONS

"Analysis of Accuracy of Surveillance Radar Image Overlay by Using Georeferencing Method"; Jacek Lubczonek; IEEE, Radar Symposium (IRS), 2015 16th International; Dresden, DE; ISBN: 978-3-9540-4853-3 (Jun. 24-26, 2015).
(Continued)

*Primary Examiner* — Yuqing Xiao
*Assistant Examiner* — Amir J Askarian
(74) *Attorney, Agent, or Firm* — Volpe Koenig (57) ABSTRACT

A method, device and system for generating a transformation function, mapping position detections of objects in a scene, detected with a positioning device, to a graphical representation of the scene. The teachings enable the detected positions by the positioning device to be mapped to the graphical representation of the monitored scene without the need of previous references to geographical coordinate systems for the positioning device and the graphical representation of the scene. Virtually any type of image may hence be used as a graphical representation of the scene, even hand-drawn sketches.

12 Claims, 4 Drawing Sheets

(51) Int. Cl.
    *G01S 7/295*    (2006.01)
    *G01S 7/40*     (2006.01)
    *G01S 17/42*    (2006.01)
    *G01S 7/51*     (2006.01)
    *G01S 13/42*    (2006.01)
    *G01S 7/06*     (2006.01)
    *G01S 7/497*    (2006.01)
    *G01S 13/88*    (2006.01)
    *G01S 17/86*    (2020.01)
    *G06K 9/00*     (2006.01)
(52) U.S. Cl.
    CPC .............. *G01S 17/42* (2013.01); *G01S 17/86* (2020.01); *G06K 9/0063* (2013.01)

(56) References Cited

U.S. PATENT DOCUMENTS

| | | | | |
|---|---|---|---|---|
| 8,786,596 | B2 * | 7/2014 | House | G06T 15/10 345/419 |
| 9,471,986 | B2 | 10/2016 | Janky et al. | |
| 2008/0300787 | A1 | 12/2008 | Zeng | |
| 2010/0066828 | A1 * | 3/2010 | Disaro | H04N 17/002 348/143 |
| 2013/0002717 | A1 | 1/2013 | Deffeyes et al. | |
| 2013/0128050 | A1 * | 5/2013 | Aghdasi | G06K 9/3241 348/158 |
| 2014/0125658 | A1 * | 5/2014 | Bell | G06T 19/20 345/419 |
| 2014/0320397 | A1 * | 10/2014 | Hennessey | A61B 3/113 345/156 |
| 2015/0264332 | A1 * | 9/2015 | Mc Kay | G01S 7/4808 348/46 |
| 2015/0288951 | A1 * | 10/2015 | Mallet | H04N 17/002 348/46 |
| 2015/0292883 | A1 | 10/2015 | Bejeryd et al. | |
| 2016/0223647 | A1 | 8/2016 | Nichols et al. | |
| 2016/0291147 | A1 | 10/2016 | Bellett et al. | |
| 2017/0193693 | A1 * | 7/2017 | Robert | G06K 9/00664 |
| 2018/0255211 | A1 * | 9/2018 | Kniffen | H04N 5/23293 |
| 2019/0147619 | A1 * | 5/2019 | Goldman | B64C 39/024 382/154 |

FOREIGN PATENT DOCUMENTS

JP    2011123071 A2    6/2011
WO    99/42855 A1      8/1999

OTHER PUBLICATIONS

EP 17165028.6 European Search Report (dated Oct. 6, 2017).

* cited by examiner

METHOD, DEVICE AND SYSTEM FOR MAPPING POSITION DETECTIONS TO A GRAPHICAL REPRESENTATION

FIELD OF INVENTION

The present teachings relate to the field of mapping position detections to a graphical representation. In particular, it relates to a method, device and system for generating a transformation function mapping position detections of objects in a scene, detected with a positioning device, to a graphical representation of the scene.

BACKGROUND

Positioning devices such as radar and Light Detection and Ranging (LIDAR) devices are typically used for measuring distances to objects and the object's velocities in relation to the positioning device. The positioning devices may be found in various terrestrial, airborne or otherwise mobile application areas; air and terrestrial traffic control, astronomy, air-defense systems, anti-missile systems, marine applications, obstacle detection in autonomous vehicles etc. Recently it has been found that such positioning devices may also be used in non-military surveillance and monitoring applications such as detecting objects in a parking lot, a shopping mall or other areas where surveillance is needed, both outdoors and indoors. In such surveillance applications, the positioning devices will be an aid for a security operator in detecting moving objects and the distance to these detected objects.

It is common to equip mobile positioning devices with a transceiver for logging the geolocations of the positioning device, e.g. according to a global navigation satellite system (GNNS) standard such as the GPS coordinates of the positioning device to provide a framework for georeferencing the detected object positions and to easily relate the detections to locations displayed on a georeferenced map. But when integrating the positioning devices in monitoring devices typically being securely mounted at fix locations it is rare to add such transceivers due to added cost and complexity of the monitoring device it would imply.

However, there is still a need for a security operator managing a monitoring device or system comprising a positioning device to be able to relate the detected object positions to locations in a graphical representation of the monitored scene. Further the graphical representations of the monitored areas in monitoring and surveillance applications may not be referenced to geolocations. Georeferenced maps and images are frequently not available in the adequate resolution or updated with latest interior design or exterior landscaping. Instead images, drawings or blue prints which are typically not georeferenced may be used as an aid for the security operator.

Hence, there is a need for further improvements for mapping position detections of objects in a scene, detected with a positioning device, to a graphical representation of the scene.

SUMMARY

In view of the above, it is thus an object of the present disclosure to provide an improved method, device and system for generating a transformation function, which maps position detections of objects in a scene, detected with a positioning device, to a graphical representation of the scene.

According to a first aspect, the above object is achieved by a method in a monitoring device for generating a transformation function, mapping position detections of objects in a scene, detected with a positioning device, to a graphical representation of the scene, the method comprising: detecting a first position of an object positioned in a first calibration position in the scene with the positioning device, wherein the detected first position is a position relative to the position of the positioning device, receiving a first set of image coordinates representing the first calibration position in the graphical representation of the scene, storing the received first set of image coordinates and the, by the positioning device, detected first position corresponding to the first calibration position in a memory, detecting a second position of an object positioned in a second calibration position in the scene with the positioning device, wherein the detected second position is a position relative to the position of the positioning device, receiving a second set of image coordinates representing the second calibration position in the graphical representation of the scene, storing the received second set of image coordinates and the, by the positioning device, detected second position corresponding to the second calibration position in a memory, and, generating a transformation function mapping position detections from the positioning device to locations in the graphical representation of the scene by comparing the stored first set of image coordinates and the, with the positioning device, detected first position corresponding to the first calibration position to the stored second set of image coordinates and the, with the positioning device, detected second position corresponding to the second calibration position.

In this manner, a transformation function is generated for mapping position detections from the positioning device to locations in a graphical representation of the monitored scene. This calibration method has the advantage that no previous references to geographical coordinate systems are needed for the positioning device nor the graphical representation of the scene. This simplifies the technical complexity and cost of the monitoring device and system as less components are needed in the monitoring device. It also implies that virtually any type of image may be used as a graphical representation of the scene, even hand-drawn sketches may be scanned and used as a representation of the scene. Further, as the layout of the scene is updated; e.g. if a new tree or bush is planted, or if new parking spaces are added to the parking lot, a new version of the graphical representation of the scene may be easily created and stored in the monitoring device and system.

The method according to the first aspect also offers a user-friendly and time-efficient scheme for performing the calibration as the operator is free to choose a first and second calibration position that may correspond to a landmark being easy to recognize in the graphical representation of the scene. By choosing calibration positions that are easily recognized and found in the graphical representation of the scene the accuracy in the mapping may also be improved.

According to a variant of the method, receiving the first set of image coordinates representing the first calibration position in the graphical representation of the scene is performed in response to requesting a first location representing the first calibration position in the graphical representation, and, receiving the second set of image coordinates representing the second calibration position in the graphical representation of the scene is performed in response to requesting a second location representing the second calibration position in the graphical representation.

This further improves the calibration process from the perspective of the person performing the calibration. Further requesting locations representing the first and second calibration positions in the graphical representation of the scene will guide the person performing the calibration through the calibration process in a time-efficient manner.

Requesting a first location representing the first calibration position may in a further embodiment of the present teachings comprise requesting a user to mark the first location in a graphical user interface of the positioning device displaying the graphical representation of the scene, and, requesting a second location representing the second calibration position further comprises requesting a user to mark the second location in the graphical user interface of the positioning device displaying the graphical representation of the scene.

The addition of requesting a user to mark the location in the graphical user interface of the positioning device displaying the graphical representation of the scene further improves the calibration process from the perspective of the person performing the calibration. By marking the location in the graphical user interface of the positioning device displaying the graphical representation of the scene the location may be easily identified using the graphical representation of the scene and the user does not need to handle numerical values representing the location or worrying about which type of coordinate system to use etc.

The object detected in the first and second calibration position respectively may be a movable object, and the present teachings may further comprise tracking the movable object in the scene to the first and second calibration position, respectively, using the positioning device.

An advantage of tracking a movable object to the first and second calibration position is this eases the requirements on the scene during the calibration process. By tracking a movable object to the calibration positions there may also be other movable objects in the scene during the calibration process without interfering with the identification of calibration positions. Hence this eases the requirements of the conditions in the scene during the calibration and also improves the time-efficiency and user-friendliness of the calibration process.

The method according to the present teachings may also further comprise tracking the movable object from a predetermined position in the scene to at least one of the first and second calibration position using the positioning device.

Having a predetermined position in the scene from which the movable object is tracked from, further improves the reliability of the identification of the movable object to track and also makes it easier to identify which movable object to track for finding the first and second calibration positions.

The predetermined position may be a position in the close proximity of the positioning device.

An advantage of using the position of the positioning device as a predetermined position is that is a position that is common and easy to find in practically all monitoring and surveillance systems.

The movable object in the scene may in a further embodiment of the present teachings be identified by comparing the track it follows to a predetermined pattern.

This provides an alternative method for identifying the movable object to track to the first and second calibration position. The same advantages that are mentioned in connection to the fifth embodiment also apply for the seventh embodiment.

The positioning device may be one of a radar device or a LIDAR (Light Detection and Ranging) device. Radar and LIDAR devices are versatile positioning devices which may detect positions and velocities of objects in a scene with proven reliability, further the strength of the reflected signal, detected at these devices, may be used for object classification related to the size of the detected objects. These devices are not prone to false object detections due to lighting artefacts, like e.g. shadows, in the scene which is the case for many monitoring systems based on video analysis.

Detecting the first position of an object positioned in the first calibration position in the scene may in a further embodiment of the present teachings comprise estimating a theoretical position of the object by extrapolating the position of the object from two previously detected positions and calculating a weighted mean of the estimated theoretical position of the object and a detected position of the object.

An advantage with detecting the first position of the object by extrapolating the position of the object from a previously detected position using the detected velocity of the object in the previously detected position is that the resolution in the position detections may be improved.

The graphical representation of the scene may be one of a drawing, a technical drawing, an image, an aerial image, a satellite image, a map, an image from a monitoring camera. A wide variety of image types may hence be used as a graphical representation of the scene, which eases the requirements of the format of the graphical representation of the scene and further makes it easier for a security operator to update and handle the graphical representation of the scene.

The method according to the present teachings may further comprise receiving two sets of geographical longitude and latitude coordinates for two locations in the graphical representation of the scene, or as an alternative, one set of geographical longitude and latitude coordinates for one location in the graphical representation of the scene and a compass direction in the graphical representation of the scene. This adds the advantage of being able to calculate the geographical longitude and latitude coordinates of any location in the graphical representation of the scene using the generated transformation function. Position detections made by the positioning device may hence not only be marked in the graphical representation of the scene, but also tagged with a geographical longitude and latitude coordinates. This further adds the possibility of coordinating position detections from several positioning devices having separate detection sectors.

The method may further comprise receiving the graphical representation of the scene from a user uploading a file comprising the graphical representation of the scene.

This provides an easy to use method for configuring and updating the monitoring device with an accurate graphical representation of the scene. It further provides a method that ensures that a wide variety of images may be used as a graphical representation of the scene.

The method according to the present teachings may comprise, as an alternative to what is previously mentioned, with regards to receiving the graphical representation of the scene from a user, uploading a file comprising the graphical representation of the scene, receiving the graphical representation of the scene in response to requesting the graphical representation of the scene from an image repository in a network connected device.

By receiving the graphical representation of the scene from an image repository in a network connected device images captured by cameras may be used.

According to a second aspect, the present disclosure relates to a monitoring device for generating a transformation function mapping position detections of objects in a scene, detected with a positioning device, to a graphical representation of the scene. The monitoring device according to the second aspect of the present teachings comprises: a positioning device arranged to detect positions of monitored objects in the scene as a relative position to the position of the positioning device, wherein one of the detected positions corresponds to an object positioned in a first calibration position in the scene and another of the detected positions corresponds to an object positioned in a second calibration position in the scene, a receiving unit arranged to receive a first set of image coordinates representing the first calibration position in a graphical representation of the scene and a second set of image coordinates representing the second calibration position in the graphical representation of the scene, a memory arranged to store the received first set of image coordinates and the, by the positioning device, detected first position corresponding to the first calibration position and the received second set of image coordinates and the, by the positioning device, detected second position corresponding to the second calibration position, a calibration unit arranged to generate a transformation function mapping position detections from the positioning device to locations in the graphical representation of the scene by comparing the stored first set of image coordinates and the, by the positioning device, detected first position corresponding to the first calibration position to the stored second set of image coordinates and the, by the positioning device, detected second position corresponding to the second calibration position. The advantages mentioned in relation to the first aspect are also applicable for this second aspect, and analogue embodiments may be applied.

According to a third aspect, the present disclosure relates to a system for generating a transformation function mapping position detections of objects in a scene, detected with a positioning device, to a graphical representation of the scene. The system according to the third aspect comprises a monitoring device according to the second aspect, and, an installation device, comprising: a graphical user interface of the monitoring device, wherein the graphical user interface displays the graphical representation of the scene, and, a user input means arranged to receive user input corresponding to a first set of image coordinates representing the first calibration position in the graphical representation of the scene and a second set of image coordinates representing the second calibration position in the graphical representation of the scene. The advantages mentioned in relation to the first aspect are also applicable for this third aspect, and analogue embodiments may be applied.

A further scope of applicability of the present teachings will become apparent from the detailed description given below. However, it should be understood that the detailed description and specific examples, while indicating preferred embodiments of the teachings, are given by way of illustration only, since various changes and modifications within the scope of the disclosure will become apparent to those skilled in the art from this detailed description. It is further noted that the present teachings relate to all possible combinations of features listed in relation to embodiments disclosed above or below, unless explicitly stated otherwise or technically impossible.

Hence, it is to be understood that the present teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an," "the", and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

Further, in the figures like reference characters designate like or corresponding parts throughout the several figures.

DETAILED DESCRIPTION

Positioning devices such as LIDAR and radar devices have recently gained interest in non-military surveillance applications due their reliable ability to detect objects and position and velocity of the detected objects. Previously, object detection has mainly been performed by means video analytics which also have been prone to generate false positive alarms of moving objects in the scene due to e.g. shadows, changes in lighting of the scene, small animals such as insects or spiders moving across the lens of monitoring camera, or rabbits or birds moving in the scene etc.

Figure 1:
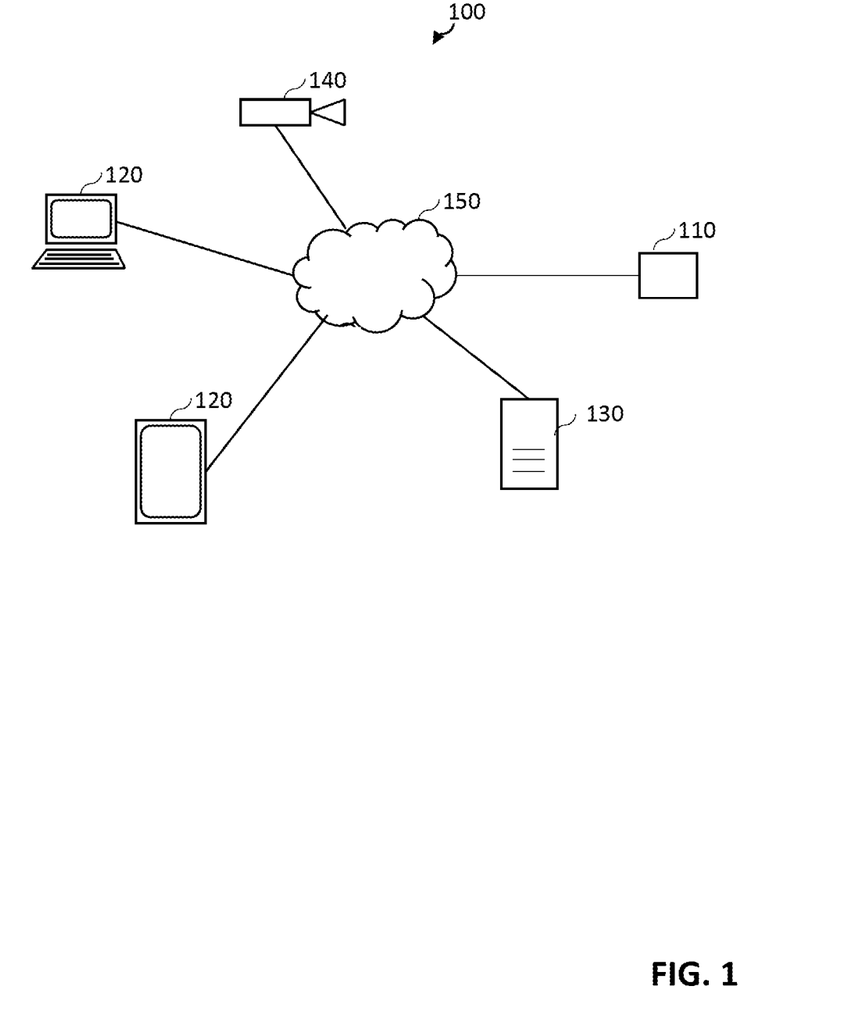
FIG. 1 illustrates a monitoring system with a monitoring device comprising a positioning device.

The positioning devices may be integrated in network connected monitoring devices 110, the network connection provides the possibility of transmitting the detections made by the positioning device to other devices connected to the network in a monitoring system 100 such as a client device 120 used by a security operator, a server 130 for storing and managing the detections from the monitoring device and other monitoring devices on the network, sometimes called a VMS (Video Management System), or a monitoring camera 140, see FIG. 1 illustrating a monitoring system. The network communication may e.g. be based on IP, RTP, RTSP, HTTP, HTTPS or other standardized network communication protocols. The monitoring device 110 in which the positioning device is integrated in may also comprise other sensors for monitoring a scene such as image sensors for generating still images or video images, thermal image sensors, time-of-flight sensors, PIR-detectors, microphones and various other types of monitoring sensors.

Figure 2:
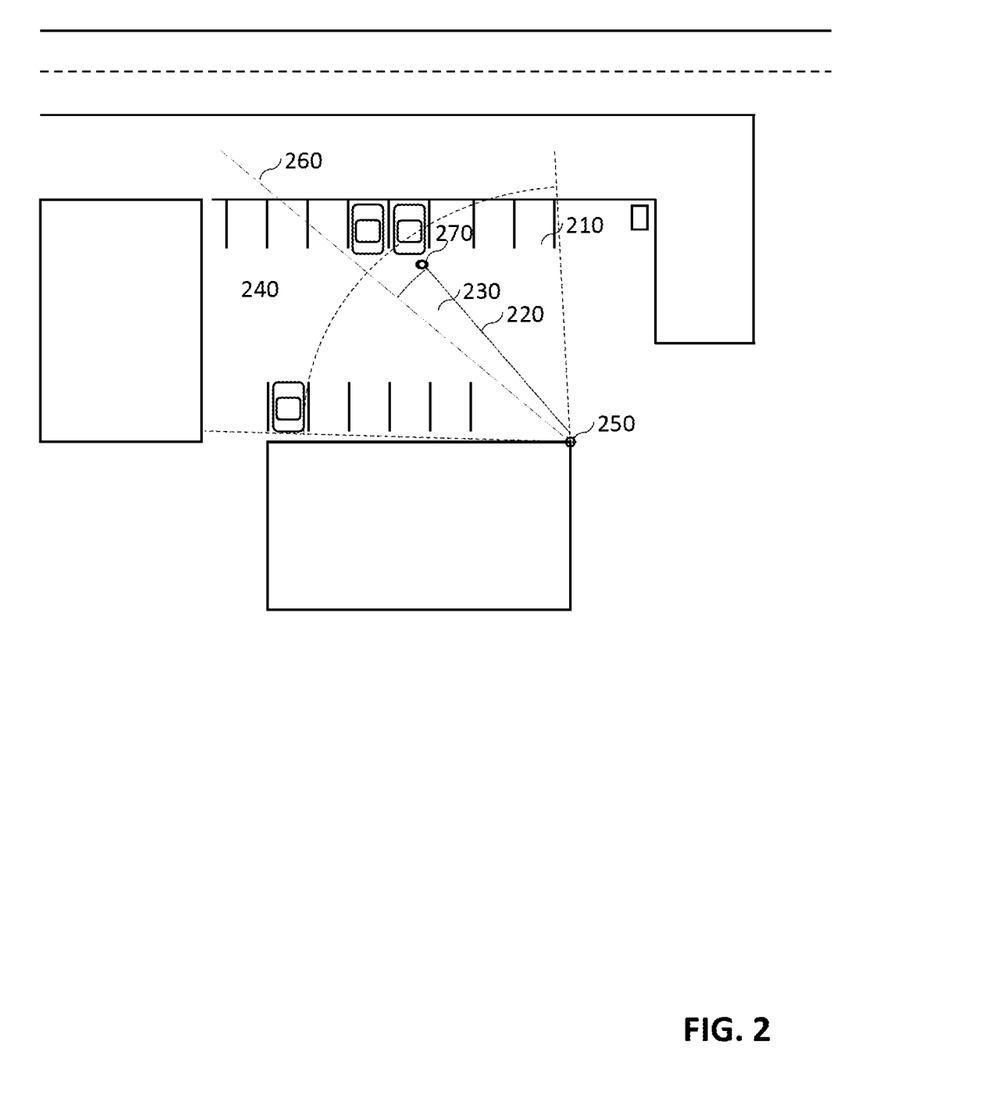
FIG. 2 illustrates a scene monitored by a monitoring device comprising positioning device.

Positioning devices, such as radar and LIDAR devices, typically visualize the object detections in polar coordinates (r,$\theta$), where r is a distance 220 and $\theta$ is an angle 230 to a detected object 270 (this angle 230 may also be called the azimuth angle), with reference to the position 250 and direction 260 of the positioning device, see FIG. 2. The object detections are typically plotted in a sector 210 with the positioning device located at the origin for the sector 210, see FIG. 2 where the sector 210 is overlaid on the scene 240 for illustrative purposes. In FIG. 2, the direction 260 of the positioning device, has been chosen to overlap with the direction of the detection axis of the positioning device, however other directions may also be chosen as a reference direction for the detections made with the positioning device.

Compared to video images from a monitoring camera it may be difficult to fully take advantage of the information outputted from the positioning device as security personnel, such as system integrators setting up, configuring and installing the surveillance systems and security operators responsible for monitoring and managing the operation of the surveillance systems are not used to work with positioning devices and interpret the signals from positioning devices.

In order to gain a better and understanding of the detections from a positioning device such as a radar device the present teachings propose to map the output signals on a graphical representation of the scene it monitors. In this way, it will be easier for a security operator to relate the detections from the positioning device to the scene and, if available, also to video images of the scene from monitoring cameras 140 monitoring the same or a related scene.

In many surveillance and monitoring systems, detection rules, e.g. connected to a location or area in the scene, are configured to e.g. generate alerts, events or alarms triggered by object detection in a predefined location or area of the scene. These detection rules may also be configured to trigger on position detections from a positioning device, and as the configuration of this kind of detection rules typically are made by defining the locations and areas in a graphical representation of the scene the calibration method according to the present teachings will useful as an aid in setting up and configuring the detection rules.

The scene monitored by the positioning device may in this case be located indoors or outdoors, it may be a monitored area such as a parking space, a shopping mall, a terminal at an airport, a field or a square in a city environment etc. The graphical representation of the scene would typically be an overview of the scene, such as a view from above the scene. Examples of graphical representation of the scene include; images, images captured by a monitoring camera, a technical image such as a blue print, a drawing, an aerial image, a satellite image, a map or the like.

The view of the graphical representation of the scene is preferably from a direction perpendicular to the ground plane of the scene, or phrased differently, preferably perpendicular to the plane in which detections are made by the positioning device. Hence if the graphical representation of the scene is captured by a camera the optical axis of the lens of the camera may preferably be perpendicular to the ground plane of the scene. Graphical representations of the scene may hence also be generated by applying image warping transformations, known in the art, on graphical representations from views deviating from the preferred overview view. Various perspective transformation functions may be applied to e.g. an image from a monitoring camera e.g. placed at a location high up on the roof of a building and monitoring the scene from above but not having the preferred view of the scene.

The graphical representation of the scene is typically stored as a file in memory of the monitoring device and is used in the graphical user interface of the monitoring device. A user of the monitoring device may hence upload a file comprising the graphical representation of the scene to the monitoring device. As an alternative the file comprising the graphical representation of the scene may be received at the monitoring device from an image repository such as an online image repository for maps or satellite images, or an image repository connected to a monitoring camera. The monitoring device may request a new version of the graphical representation of the scene from a user or from the image repository if a predetermined time period has passed since the last time it was updated or if there are other indications, such as alerts or events received from other monitoring devices connected to the same monitoring system, that the monitored scene has changed.

To map detections from a positioning device to a graphical representation of the scene a transformation function is generated based on at least two calibration positions and the corresponding locations in the graphical representation of the scene. The method 300 for generating a transformation function mapping position detections of objects in a scene, detected with a positioning device, to a graphical representation of the scene, is further explained with reference to FIG. 3. The steps of the method 300 are in FIG. 3 arranged in an exemplary order, a person skilled in the art will however also understand that the steps of the method 300 may be arranged in another order within the scope of the present teachings. Further, optional steps of the method 300 have been marked with dashed lines in FIG. 3.

Figure 3:
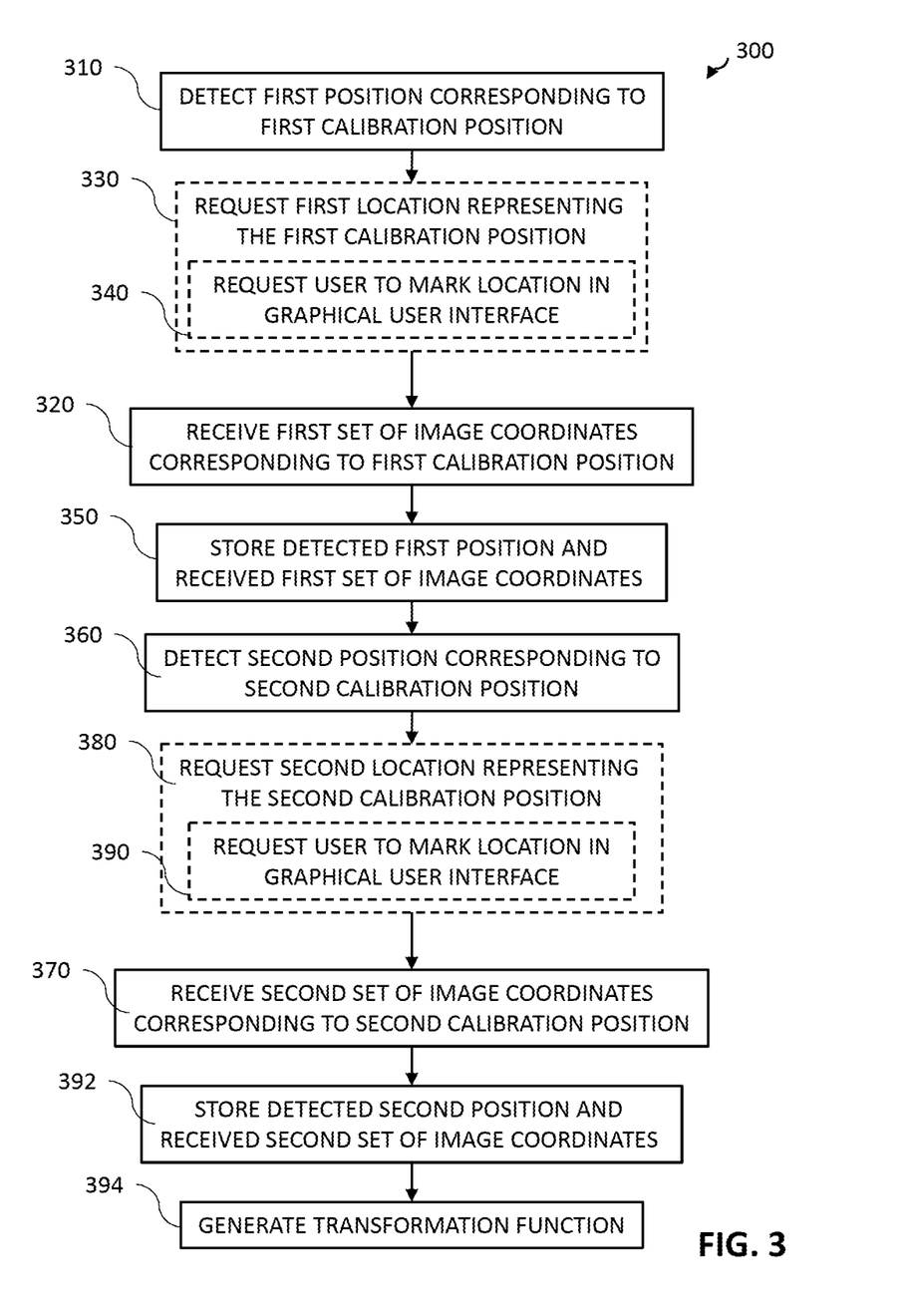
FIG. 3 is a flowchart of a method for generating a transformation function mapping position detections of objects in a scene, detected with a positioning device, to a graphical representation of the scene.

A first position of an object positioned in a first calibration position in the scene is detected with the positioning device 310. The positioning device typically detects this first position relative to the position of the positioning device. A first set of image coordinates representing the first calibration position in the graphical representation of the scene is then received 320 at the monitoring device, comprising the positioning device. This set of coordinates may be received in response to an optional step of requesting user input from an operator 330.

As yet an optional step this input may be made by a user marking the coordinates in a graphical user interface 340. The marking may be performed by clicking, pointing or otherwise marking a location in a graphical user interface, e.g. displayed on an installation device such as a tablet computer, mobile phone with touch display or dedicated installation tool. If the numerical values of the coordinates are known these coordinates may of course alternatively be entered and received 320 at the monitoring device comprising the positioning device.

The received first set of image coordinates and the, by the positioning device, detected first position corresponding to the first calibration position is stored 350 in a memory and the method then continues with detecting 360 a second position of an object positioned in a second calibration position in the scene with the positioning device.

The first and second object may of course be the same object, but in some circumstances, it may an advantage to use separate objects for detecting the first and second position. By having two different objects for detecting the first and second position, the two calibration positions may for example be detected at the same time and if it is decided that the two calibration positions should be located on either sides of large parking lot monitored by a positioning device then the time required for the calibration may be decreased by having to separate objects that could be detected at the same time, compared to having one object that has to move from the first to the second calibration position.

A second set of image coordinates representing a second calibration position in the graphical representation of the scene, is then received 370 at the monitoring device comprising the positioning device. As for the first set of image coordinates the second set of image coordinates may also be received in response to an optional request 380 for user input and the second set of image coordinates may also be received after a user marking 390 the second set of coordinates in a graphical user interface (also as an optional step). The received second set of image coordinates and the, by the positioning device, detected second position corresponding to the second calibration position is then stored 392 in a memory.

The calibration positions may be any position in the scene monitored by the positioning device. However, in a preferred scenario they are located far apart, for example close to the perimeters of either side of the monitored scene. The accuracy in the mapping of detections to image coordinates in the graphical representation of the scene will improve if the calibrations positions are located far apart.

In order for a user to be able to recognize, find and mark the locations corresponding to the calibration positions in the graphical representation of the scene the calibration positions are preferably chosen to correspond to a landmark that is easy to find and recognize in the graphical representation of the scene as well as in real life. Examples include, defined constructional features such as corners of buildings, pavements, signs, lamp posts, furniture trees, flowerbeds etc. This will improve the accuracy in the correlation between the detected calibration positions and the received sets of image coordinates in the graphical representation of the scene and hence also the accuracy in the generated transformation function for the mapping.

In the above example a calibration method based on two calibration positions have been discussed, within the scope of the present teachings it is of course also possible to use more than two calibration positions. A reason for doing this could be to improve the accuracy in the transformation function for the mapping. As an example, the position of the positioning device may be used as an additional calibration position, and as it known that this position corresponds to the position (0,0) in the coordinate system of the monitored scene, it is not needed to direct an object to this calibration position in order to make a detection. It will be enough to receive a set of image coordinates corresponding to the position of the positioning device in the graphical representation of the scene.

A transformation function mapping position detections from the positioning device to locations in the graphical representation of the scene is then generated 394 by comparing the stored first set of image coordinates and the, with the positioning device, detected first position corresponding to the first calibration position to the stored second set of image coordinates and the, with the positioning device, detected second position corresponding to the second calibration position. The transformation function would typically be able to handle translation, rotation and scaling transformations from the coordinate system of the position detections by the positioning device to the graphical representation of the scene.

By applying textbook trigonometry, e.g. based on triangulation or trilateration, when comparing the stored sets of image coordinates with the stored detected positions the transformation function may be deduced. An example of how this may be performed is explained below to illustrate one alternative for generating a transformation function.

In generating the transformation function the applicable scale in meters per pixels, m/pixel, in the graphical representation of the scene and the direction of the detection axis of the positioning device may be used.

The scale may be estimated by calculating the distance between the first calibration position and the second position using the detected object positions in the first and second calibration position and the corresponding distance in the graphical representation of the scene in number of pixels. The scale may then be estimated by dividing the distance in meters with the distance in pixels.

The direction of the detection axis of the positioning device may be calculated using the angles of the detected calibration positions and applying standard triangulation methods.

The transformation function, mapping position detections from the positioning device to locations in the graphical representation of the scene, may then be divided in two different parts. One corresponding to the horizontal image coordinate (here denoted as the x coordinate), and one corresponding to the vertical image coordinate (here denoted as the y coordinate), see equations (1) and (2) below. The detected distance from the positioning device 220 is here denoted by p_range, a is the scaling factor in pixels/m, direction is the direction 260 of the detection axis of the positioning device compared to the horizontal x-axis in the graphical representation of scene and p_angle is the angle 230 of the detected position with reference to the detection axis 260 of the positioning device.

$$x = p\_range \cdot \alpha \cdot \cos(\text{direction} + p\_angle) \quad \text{(Equation 1)}$$

$$y = p\_range \cdot \alpha \cdot \sin(\text{direction} + p\_angle) \quad \text{(Equation 2)}$$

In the example mentioned above a polar coordinate system is used for visualizing the detections from the positioning devices. However positioning devices may also visualize the object detections in Cartesian coordinates (x,y) using a similar method for generating a transformation function mapping position detections of objects in a scene, detected with a positioning device, to a graphical representation of the scene.

In a preferred embodiment, the calibration positions are detected by tracking a movable object to the first and second calibration position, using the positioning device. As the positioning device is detecting the positions of objects in the scene, object tracks or sets of consecutive positions corresponding to the detected positions of the same object, may be compiled in the monitoring device. By identifying one of these objects as an object to track to the calibration positions the monitoring device will be able to identify the calibration positions even though there are more than one moving object in the scene.

First the object to track to the calibration position needs to be identified. This may be performed in various ways, according to one embodiment the object is identified by its initial position. E.g. the calibration scheme may be set up to identify an object to track based on if the object is located in a position corresponding to a predetermined position in the scene. An example of such a predetermined position, which is also easily identifiable, is the position right below the position where the monitoring device, and hence also the positioning device, is located in the scene, or a position in close proximity to this position. There may for example be an accepted uncertainty in the position of an object related to the accuracy of the positioning device. The monitoring device would then identify a movable object moving in to the scene from a position right below the monitoring device as an object to track to the calibration positions. As an alternative to a predetermined position for identifying a movable object to track to a calibration position, a travel direction may also be predetermined and used for identifying the movable object. An example of such a predetermined direction may be a consistent radial direction away from the positioning device.

A calibration position may be detected as a position where the identified object e.g. stops and stays for at least a predetermined time period, such as e.g. 5 s., or by the trace of positions it follows. This enables a person configuring and calibrating the positioning device to first walk around in the scene during which the detections from the positioning device are recorded and then, at a later point in time, identify the calibration positions by the time period spent at a position or the trace of positions detected, and let the positioning device receive the image coordinates representing the calibration positions in the graphical representation of the scene.

Alternatively, the calibration position is identified as the detected position where the tracked object is located when the image coordinates denoting the location corresponding to the calibration position in the graphical representation of the scene is received at the monitoring device.

As an alternative embodiment, the object to track to the calibration positions may be identified by the comparing the track of the movable objects in the scene to a predetermined pattern. Examples of predetermined patterns include a circle or the shape of the number "8", and in this manner, the positioning device, or the control unit thereof, may identify the object to follow.

By mapping at least two locations in the graphical representation of the scene to a set of geographical longitude and latitude coordinates, or at least one location in addition to a compass direction, the detected locations may be further given a geographical coordinate. This also allows for combining different non-overlapping scenes in one graphical representation. By combining the detections from more than one monitoring device or positioning device in one graphical representation a security operator monitoring the area will gain a better understanding of the whole monitored area.

The accuracy and resolution in the position detections from a positioning device may be limited due to various reasons, (e.g., there are regulations limiting the signal strength as well as the available part of the spectrum for both LIDAR and radar devices). In order to improve the accuracy and resolution in the position detections, position detections of objects positioned in one of the calibration positions may calculated using a weighted mean of an estimated theoretical position and a measured, or detected, position. The estimation of the theoretical position may be based on two, or more, previously detected positions and the calculated velocity of the object from these positions and the measured time period in between these detections. When calculating the mean of the estimated theoretical position and the detected position, equal weights may e.g. be applied. The calculation may also be optimized by giving the most reliable component the highest weight. By using a weighted mean based on several detected positions the accuracy and resolution in the position detection will be increased, a method also known as Kalman filtering.

Figure 4:
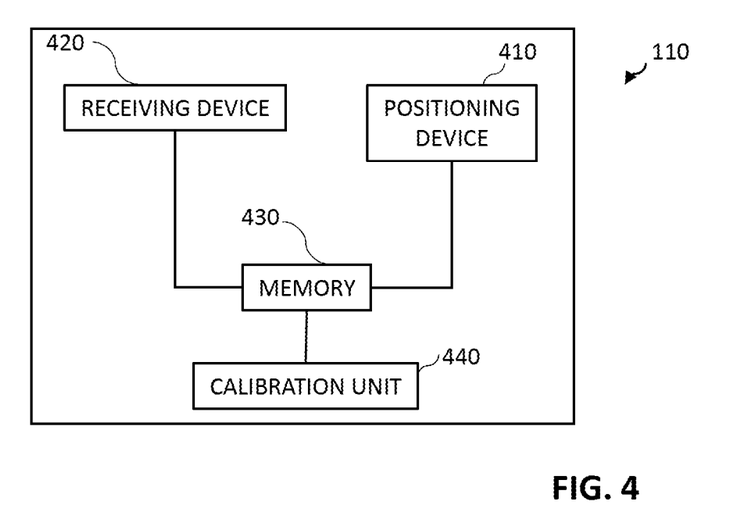
FIG. 4 is a schematic block diagram of a monitoring device comprising a positioning device.

A monitoring device 110 for generating a transformation function mapping position detections of objects in a scene, detected with a positioning device, to a graphical representation of the scene, will now be further discussed with reference to FIG. 4. As the monitoring device 110 performs the earlier discussed method 300, features and advantages that has been earlier discussed with relation to the method 300 also applies for the monitoring device 110. The monitoring device 110 comprises a positioning device 410 arranged to detect positions of monitored objects in the scene as relative positions to the position of the positioning device 250. The detected positions may e.g. correspond to positions of an object positioned in a first or a second calibration position in the scene. A receiving unit 420 in the monitoring device 110 is arranged to receive sets of image coordinates representing the calibration positions in the graphical representation of the scene. A memory 430 in the monitoring device 110 is arranged to store the received sets of image coordinates and the, by the positioning device, detected positions corresponding to the calibration positions. The memory 430 may also store a file comprising the graphical representation of the scene, alternatively this file may be stored at a separate memory. A calibration unit 440 in the monitoring device 110 is arranged to generate a transformation function mapping position detections from the positioning device to locations in the graphical representation of the scene by comparing the stored sets of image coordinates the detected positions corresponding to the calibration positions. The generated transformation function may then be transmitted from the calibration unit 440 to any other unit in the monitoring device 110 or the monitoring system 100 that e.g. will generate a graphical user interface mapping position detections from the positioning device on the graphical representation of the scene.

Figure 5:
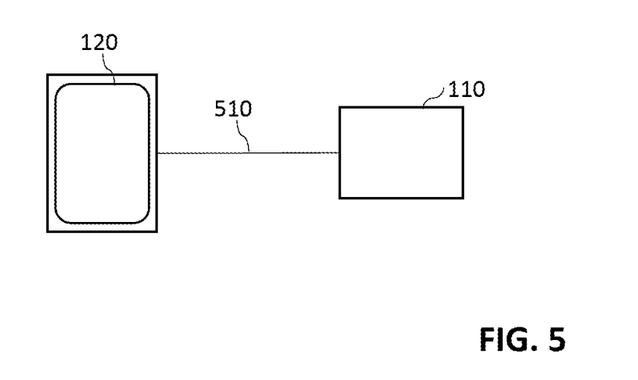
FIG. 5 is a schematic block diagram of a monitoring system comprising a monitoring device and an installation device.

A system 500 for generating a transformation function mapping position detections of objects in a scene, detected with a positioning device, to a graphical representation of the scene, will now be further discussed with reference to FIG. 5. The system 500 comprises the earlier discussed monitoring device 110 and an installation device 510. The installation device 510 is connected to the monitoring device 110 (e.g., over a wireless network connection). The installation device 510 comprises a graphical user interface of the monitoring device, displaying the graphical representation of the scene for a person configuring, or setting up, a monitoring system 100. Further the installation device 510 comprises a user input means arranged to receive user input corresponding to sets of image coordinates representing the calibration positions in the graphical representation of the scene. Various tablet computers, mobile phone having a touch display or dedicated installation tools for monitoring systems may be used as an installation device 510.

It will be appreciated that a person skilled in the art can modify the above described embodiments in many ways and still use the advantages of the present teachings as shown in the embodiments above. Thus, the present teachings should not be limited to the shown embodiments but should only be defined by the appended claims. Additionally, as the skilled person understands, the shown embodiments may be combined.

What is claimed is:

1. A method in a monitoring device for generating a transformation function mapping position detections of objects in a scene, detected with a positioning device, to a graphical representation of the scene, the method comprising:

detecting a first position of an object positioned in a first calibration position in the scene with the positioning device, wherein the detected first position is a first position relative to the position of the positioning device;

receiving a first set of image coordinates representing the first calibration position in the graphical representation of the scene, wherein the first set of image coordinates are received in response to an input marking a first location from a graphical user interface of the positioning device displaying the graphical representation of the scene representing the first calibration position in the graphical representation;

storing the received first set of image coordinates and the detected first position corresponding to the first calibration position in a memory;

detecting a second position of an object positioned in a second calibration position in the scene with the positioning device, wherein the detected second position is a second position relative to the position of the positioning device;

receiving a second set of image coordinates representing the second calibration position in the graphical representation of the scene, wherein the second set of image coordinates are received in response to an input marking a second location from the graphical user interface of the positioning device displaying the graphical representation of the scene representing the second calibration position in the graphical representation;

storing the received second set of image coordinates and the detected second position corresponding to the second calibration position in a memory; and generating a transformation function mapping position detections from the positioning device to locations in the graphical representation of the scene, wherein the transformation function is generated by comparing the stored sets of image coordinates with the stored detected positions, wherein the transformation function handles translation, rotation and scaling transformations from a coordinate system of the position detections from the positioning device to locations in the graphical representation of the scene, wherein the positioning device is one of a radar device or a LIDAR device.

2. The method according to claim 1, wherein the object detected in the first and second calibration position respectively is a movable object, and wherein the method further comprises tracking the movable object in the scene to the first and second calibration position, respectively, using the positioning device.

3. The method according to claim 2, further comprising tracking the movable object from a predetermined position in the scene to at least one of the first and second calibration position using the positioning device.

4. The method according to claim 3, wherein the predetermined position is a position in the close proximity of the positioning device.

5. The method according to claim 2, further comprising identifying the movable object in the scene by comparing the track it follows to a predetermined pattern.

6. The method according to claim 1, wherein detecting the first position of an object positioned in the first calibration position in the scene comprises estimating a theoretical position of the object by extrapolating the position of the object from two previously detected positions and calculating a weighted mean of the estimated theoretical position of the object and a detected position of the object.

7. The method according to claim 1, wherein the graphical representation of the scene is one of a drawing, a technical drawing, an image, an aerial image, a satellite image, a map, an image from a monitoring camera.

8. The method according to claim 1, further comprising receiving two sets of geographical longitude and latitude coordinates for two locations in the graphical representation of the scene, or one set of geographical longitude and latitude coordinates for one location in the graphical representation of the scene and a compass direction in the graphical representation of the scene.

9. The method according to claim 1, further comprising receiving the graphical representation of the scene from a user uploading a file comprising the graphical representation of the scene.

10. The method according to claim 1, further comprising receiving the graphical representation of the scene in response to requesting the graphical representation of the scene from an image repository in a network connected device.

11. A monitoring device for generating a transformation function mapping position detections of objects in a scene, detected with a positioning device, to a graphical representation of the scene, the monitoring device comprising:

a positioning device configured to detect positions of monitored objects in the scene as a relative position to the position of the positioning device, wherein one of the detected positions corresponds to an object positioned in a first calibration position in the scene and another of the detected positions corresponds to an object positioned in a second calibration position in the scene;

an interface configured to receive a first set of image coordinates representing the first calibration position in a graphical representation of the scene and a second set of image coordinates representing the second calibration position in the graphical representation of the scene;

a memory configured to store the received first set of image coordinates, the detected first position corresponding to the first calibration position, the received second set of image coordinates and the detected second position corresponding to the second calibration position; and a processor configured to generate a transformation function mapping position detections from the positioning device to locations in the graphical representation of the scene, wherein the transformation function is generated by comparing the stored sets of image coordinates with the stored detected positions, wherein the transformation function handles translation, rotation and scaling transformations from a coordinate system of the position detections from the positioning device to locations in the graphical representation of the scene, wherein the positioning device is one of a radar device or a LIDAR device.

12. A system for generating a transformation function mapping position detections of objects in a scene, detected with a positioning device, to a graphical representation of the scene, the system comprising:

an installation device, comprising:
a graphical user interface of the monitoring device, wherein the graphical user interface displays the graphical representation of the scene; and
an interface configured to receive user input corresponding to a first set of image coordinates representing the first calibration position in the graphical representation of the scene and a second set of image coordinates representing the second calibration position in the graphical representation of the scene; and a monitoring device, comprising:
a positioning device configured to detect positions of monitored objects in the scene as a relative position to the position of the positioning device, wherein one of the detected positions corresponds to an object positioned in a first calibration position in the scene and another of the detected positions corresponds to an object positioned in a second calibration position in the scene;
a memory configured to store the received first set of image coordinates, the detected first position corresponding to the first calibration position, the received second set of image coordinates and the detected second position corresponding to the second calibration position; and
a processor configured to generate a transformation function mapping position detections from the positioning device to locations in the graphical representation of the scene, wherein the transformation function is generated by comparing the stored sets of image coordinates with the stored detected positions, wherein the transformation function handles translation, rotation and scaling transformations from a coordinate system of the position detections from the positioning device to locations in the graphical representation of the scene,
wherein the positioning device is one of a radar device or a LIDAR device.

* * * * *